3,148,049
METHOD FOR CONTROLLING PLANT GROWTH
Robert J. Herschler, Camas, Wash., assignor to Crown-Zellerbach Corporation, San Francisco, Calif., a corporation of Nevada
No Drawing. Filed Aug. 24, 1961, Ser. No. 135,708
19 Claims. (Cl. 71—2.7)

This invention relates to methods and compositions for controlling plant growth.

It is the general object of the present invention to provide versatile plant growth control agents which, depending upon the method of their application and the plant species concerned, may be used in a wide variety of applications, e.g., as herbicides, as plant growth regulating agents, as plant cutting rooting stimulators, and as fruit setting agents.

The chemical agents which I have discovered to be suitable for the foregoing diverse applications comprise in general the halogenated aliphatic keto acids having from 3–15 carbon atoms inclusive, the salts thereof, the esters thereof, and the amides thereof.

Illustrative of this group are halogenated pyruvic acid or 2-ketopropanoic acid, acetoacetic acid or 3-ketobutanoic acid, levulinic acid or 4-ketopentanoic acid, 4-ketohexanoic acid and 4,7-diketosebacic acid.

The salts of the foregoing and other halogenated aliphatic keto acids suitable for the present purpose comprise in general the alkali metal salts, the alkaline earth metal salts, the ammonium salts, the copper and other heavy metal salts and the amine salts such as the methyl amine salts.

The ester derivatives of the foregoing and other halogenated aliphatic keto acids which may be applied in the present invention are the methyl, ethyl, propyl and higher aliphatic and/or aromatic esters.

Illustrative of suitable amide derivatives of the foregoing and other halogenated aliphatic keto acids are N,N-dimethyldichlorolevulinamide and N-phenyldichlorolevulinamide.

Illustrative of suitable halogenated derivatives are the mono-, di- and tri-chloro, bromo or fluoro substituted keto acids wherein the halogen is substituted in the 2, 3, or 5 position.

Especially suitable for use in the present invention are the chlorinated pyruvic and levulinic acids, e.g., the mono-, di-, tri- and tetra-chlorolevulinic acids, and, particularly, 3,5-dichlorolevulinic acid.

When a halogenated keto acid or its derivative is to be used as a herbicide, it desirably is dissolved in or mixed with a suitable liquid or solid vehicle to form a solution, emulsion or dust of the desired strength, containing preferably from 0.1–10% by weight of the halogenated keto acid. Where use of an emulsion is contemplated, the emulsifying vehicle may be water. Where use of a solution is contemplated, the vehicle may be an organic solvent for the halogenated keto acid such as methanol, ethanol, or a solvent system such as ethanol and water. Where use as a dust is contemplated, the carrier may comprise powdered talc, diatomaceous earth, clay, or any similar finely divided material.

To increase the efficiency of the halogenated keto acid as a herbicide, a leaf penetrant also may be included in the composition. This may comprise an anionic, non-ionic or cationic surfactant and penetrant, such as dimethyl sulfoxide, diesel oil, kerosene, and other solvents.

The manner of application of the herbicidal composition is dependent upon the plant species, the plant condition and the physical environment. Thus such factors are determining as whether the plant is grown in soil or in aquatic media, whether it is juvenile or adult, whether it is a grass or broad leaf plant, and whether it is an annual or perennial. The temperature of application and the presence or absence of moisture also are significant factors, the herbicidal agents being more effective at elevated temperatures and in the presence of moisture.

The herbicidal agents accordingly may be applied in any suitable manner, as by spraying or dusting them on the plants. Where selective killing of the plants is desired, this may be accomplished by controlling the concentration, and also by spraying or otherwise applying the herbicide to the stems and leaves of the selected plants. An application of at least 10 pounds per acre of the active herbicide usually is necessary for effective herbicidal action.

Where the halogenated keto acid or its derivative is to be used as a growth regulating agent, its manner of application is similar to its use as a herbicide except that it is used in non-phytotoxic quantities, usually on plants of the perennial varieties. In addition, the inclusion of plant toxic additives such as toxic solvents is avoided.

When applied as a growth regulating agent to a perennial, the halogenated keto acid or its derivative is applied at the beginning of the growing season before the new growth starts, using an application of from 1 up to 10 lbs. per acre. In case of hardy perennials, higher amounts of up to 20 lbs. per acre may successfully be employed.

The halogenated keto acid then serves as a chemical retardant of growth, delaying the growth cycle by a time period commensurate in part with the intensity of the application. Thus by use of the halogenated keto acid preparation, a florist may extend by a substantial period the season during which he may market flowering and decorational plants of any given species.

As indicated above, the invention also may be applied to stimulating the development of roots on non-rooted plant stems, or branch cuttings. This application is of interest to nurserymen when propagating such plants as rhododendrons, English ivy, *Skimmia japonica*, *Andromeda japonica* and may other plant species.

In accordance with the invention the cuttings are treated with a solution of the halogenated keto acid or its derivative by dipping the cuttings in the solution, by spraying the solution on the cuttings, or in any other suitable manner, using the halogenated keto acid in a relatively dilute concentration, i.e., a concentration of the order of but 1000–10,000 parts per million. The halogenated keto acid also may be used in emulsion or dust form, if desired.

After applying the halogenated keto acid or its derivative, the cuttings are set in the growth medium in the usual manner, whereupon rooting occurs much more rapidly and with much greater success than is the case when application of the halogenated keto acid is not employed as a preliminary treatment.

As outlined above, it also has been discovered that the herein described halogenated keto acids and the derivatives thereof may be employed to induce fruit set in various species of plants such as snap beans, lima beans, and melons. The application is made during the growing period of the plant, but before the blooms are put out. It is made using a solution or emulsion of the halogenated keto acid or its derivative, care being taken not to exceed the phytotoxic threshold level of application, a level which obviously will be determined by such factors as the plant species and environmental conditions, and which in general is about 1–5 lbs. per acre.

The application of the invention is illustrated in the following examples:

*Example 1.—Herbicidal*

The following halogenated keto acids and their derivatives were employed: dichlorolevulinic acid; trichlorolevulinic acid; tetrachlorolevulinic acid; ethyl dichlorolevulinate; n-propyl trichlorolevulinate; sodium dichlorolevulinate; ammonium trichlorolevulinate; and dihydroabetylamine dichlorolevulinic acid salt.

These compounds were dissolved in separate solvent systems each comprising 40 volumes of ethanol and 60 volumes of water, using sufficient of each compound to form a solution containing 1% of compound by weight.

The solutions were applied individually to the stems of juvenile cucumber and lima bean plants. All of them caused severe stem deterioration at the contact point within 72 hours, resulting in death of all of the plants.

*Example 2.—Herbicidal*

Ethanol/water (40/60 by volume) solutions containing respectively 0.25% by weight dichloro, trichloro, and tetrachlorolevulinic acid were sprayed individually onto the foliage of separate plantings of 6–8 weeks old mixed narrow and broad leaf plants at levels of 17.2, 34.4 and 68.8 pounds, active ingredient basis, per acre.

Seed represented in the plantings were corn, peas, bush beans, bush lima beans, lettuce, tomatoes, cucumbers, cabbages, mixed grasses, velvet leaf, crabgrass, sorrel, plantain, Canadian thistle, Queen Anne's lace and lamb's-quarter.

At the 17.2 lbs. per acre level, the acids were selective, killing only the broad leaf species after an exposure time of 4 days. Corn in plots treated with the tri- and tetrachlorolevulinic acid showed some non-fatal leaf burn.

At the 34.2 lb. per acre level about 50% of the grasses were killed. All other plants also were killed.

At the 68.8 lb. per acre level, about 95% of the grasses were killed by dichlorolevulinic acid and 100% by the tri- and tetra-chlorolevulinic acid. All other plants also were killed.

*Example 3.—Herbicidal*

Ethanol/water (40/60 by volume) solution containing 0.25% by weight ethyl-alpha, alpha-dibromoacetoacetate was applied to the foliage of bush lima beans at a treatment level of 50 pounds, active chemical basis, per acre. The treatment rapidly killed the plants, i.e., in 4 days.

*Example 4.—Herbicidal; Aquatic Plants*

Two common aquatic plants, Lemna and Elodea, were grown separately on a balanced inorganic nutrient solution. To separate samples of this solution were added each of the following compounds, used individually at 25 and 50 parts per million concentration: dichlorolevulinic acid; monochlorolevulinic acid; trichlorolevulinic acid; tetrachlorolevulinic acid; ethyl dichlorolevulinate; and ethyl-alpha, alpha-dibromoacetoacetate.

All of the above compounds rapidly killed (i.e., in but 3 to 4 days) both aquatic plant species at both treatment levels.

*Example 5.—Growth Regulation*

The leaves and stems of established plants of ivy and *Pieris japonica* were sprayed at two-week intervals, just before new growth development, with a 0.25% solution of dichlorolevulinic acid in aqueous ethanol solution (60/40 by volume), using a dichlorolevulinic acid application of 5 pounds per acre. After 4 weeks these plants had produced little or no new growth. There was no evidence of leaf burn or stem dessication.

During the same period untreated controls had developed leaders two inches or more in length.

*Example 6.—Rooting Stimulation*

Cuttings of English ivy, *Skimmia japonica*, and *Andromeda japonica* were dipped into a 4000 p.p.m. aqueous ethanol (60/40 by volume) solution of dichlorolevulinic acid. The treated cuttings then were placed in a rooting bed with bottom heat controlled to 70° F.

At six weeks the specimens of all species evidenced 100% root development. Controls evidenced from 40–80% root development.

*Example 7.—Fruit Setting*

During the growing season, just before blooming, greenhouse bush beans were sprayed with 5 pounds per acre of dichlorolevulinic acid, applied as a 0.25% solution in water-ethanol (60/40 solution by volume).

After several weeks, all of these plants bloomed and set fruit. 50 correspondingly located control plants bloomed, but not one set any fruit.

Accordingly it is apparent that by the present invention, I have provided methods and compositions for controlling plant growth in a manner depending upon the method of application, the physical conditions and the plant species concerned. Thus, the compositions of my invention may be used as herbicides for removing plants from a given area, as growth-regulators for controlling the rate of growth of plants, as rooting stimulators for encouraging growth of plant cuttings, and as fruit sets for promoting the setting of beans, melons, and other fruits. These applications obviously are of the greatest significance to the agriculturalist and nurseryman.

Having thus described my invention in preferred embodiments, I claim as new and desire to protect by Letters Patent:

1. A method of controlling plant growth which comprises applying to the plant a growth-altering amount of at least one compound selected from the group consisting of (*a*) halogenated 2-ketopropanoic acid, 3-ketobutanoic acid, 4-ketopentanoic acid, 4-ketohexanoic acid, and 4,7-diketosebacic acid, (*b*) the alkali metal salts, alkaline earth metal salts, ammonium salts, heavy metal salts, and methyl amine salts thereof, (*c*) the lower saturated aliphatic esters thereof, and (*d*) N,N-dimethyldihalolevulinamide and N-phenyldihalolevulinamide, wherein the number of halogens in the compound does not exceed four.

2. The method of claim 1 wherein the compound is a halogenated levulinic acid.

3. The method of claim 1 wherein the compound is 3,5-dichlorolevulinic acid.

4. The method of claim 1 wherein the compound is a halogenated levulinic acid salt.

5. The method of claim 1 wherein the compound is a halogenated levulinic acid ester.

6. The method of claim 1 wherein the compound is an amide of a halogenated levulinic acid.

7. The method of controlling plant growth which comprises impregnating the soil in which the plants are to be grown with a growth-inhibiting amount of at least one compound selected from the group consisting of (*a*) halogenated 2-ketopropanoic acid, 3-ketobutanoic acid, 4-ketopentanoic acid, 4-ketohexanoic acid, and 4,7-diketosebacic acid, (*b*) the alkali metal salts, alkaline earth metal salts, ammonium salts, heavy metal salts, and methyl amine salts thereof, (*c*) the lower saturated aliphatic esters thereof, and (*d*) N,N-dimethyldihalolevulinamide and N-phenyldihalolevulinamide, wherein the number of halogens in the compound does not exceed four.

8. The method of claim 7 wherein the compound is a halogenated levulinic acid.

9. The method of claim 7 wherein the compound is 3,5-dichlorolevulinic acid.

10. The method of killing plants which comprises applying to the plant a phytotoxic amount of at least one compound selected from the group consisting of (*a*) halogenated 2-ketopropanoic acid, 3-ketobutanoic acid, 4-ketopentanoic acid, 4-ketohexanoic acid, and 4,7-diketosebacic acid, (*b*) the alkali metal salts, alkaline earth metal salts, ammonium salts, heavy metal salts, and methyl amine salts thereof (*c*) the lower saturated aliphatic esters thereof, and (*d*) N,N-dimethyldihalolevulinamide and N-phenyldihalolevulinamide, wherein the number of halogens in the compound does not exceed four.

11. The method of claim 10 wherein the compound is a halogenated levulinic acid.

12. The method of claim 10 wherein the compound is 3,5-dichlorolevulinic acid.

13. The method of claim 10 wherein the compound is a chlorolevulinic acid applied to the plant in an amount of at least 10 pounds per acre.

14. The method of stimulating plant cutting root growth which comprises applying to a plant cutting a growth-stimulating amount of at least one compound selected from the group consisting of (a) halogenated 2-ketopropanoic acid, 3-ketobutanoic acid, 4-ketopentanoic acid, 4-ketohexanoic acid, and 4,7-diketosebacic acid, (b) the alkali metal salts, alkaline earth metal salts, ammonium salts, heavy metal salts, and methyl amine salts thereof, (c) the lower saturated aliphatic esters thereof, and (d) N,N-dimethyldihalolevulinamide and N-phenyldihalolevulinamide, wherein the number of halogens in the compound does not exceed four, and then planting the cutting in a plant growth medium.

15. The method of claim 14 wherein the compound is halogenated levulinic acid.

16. The method of claim 14 wherein the compound is 3,5-dichlorolevulinic acid.

17. The method of inducing fruit set in plants which comprises applying to the plant prior to its blooming season a fruit-setting amount of at least one compound selected from the group consisting of (a) halogenated 2-ketopropanoic acid, 3-ketobutanoic acid, 4-ketopentanoic acid, 4-ketohexanoic acid, and 4,7-diketosebacic acid, (b) the alkali metal salts, alkaline earth metal salts, ammonium salts, heavy metal salts, and methyl amine salts thereof, (c) the lower saturated aliphatic esters thereof, and (d) N,N-dimethyldihalolevulinamide and N-phenyldihalolevulinamide, wherein the number of halogens in the compound does not exceed four.

18. The method of claim 17 wherein the compound is a halogenated levulinic acid.

19. The method of claim 17 wherein the compound is 3,5-dichlorolevulinic acid.

References Cited in the file of this patent
UNITED STATES PATENTS 2,395,446  Benson ---------------- Feb. 26, 1946

OTHER REFERENCES

King: "Agriculture Handbook, No. 69," May 1954, U.S. Dept. Agri., pages 4 to 7, 218 and 219.